UNITED STATES PATENT OFFICE.

WILLIAM E. RIDENOUR, OF PHILADELPHIA, PENNSYLVANIA, ASSIGNOR TO FRANKLIN CHEMICAL WORKS, OF PHILADELPHIA, PENNSYLVANIA, A CORPORATION OF PENNSYLVANIA.

MANUFACTURE OF TRISODIUM PHOSPHATE WITH HYDRATED SODIUM CARBONATE.

950,159. Specification of Letters Patent. Patented Feb. 22, 1910.

No Drawing. Application filed July 29, 1908. Serial No. 445,897.

*To all whom it may concern:*

Be it known that I, WILLIAM E. RIDENOUR, a citizen of the United States, residing in the city of Philadelphia, county of Philadelphia, and State of Pennsylvania, have invented certain Improvements in the Manufacture of Trisodium Phosphate with Hydrated Sodium Carbonate.

My present improvements comprise, in the preferred form, a non-crystalline compound produced by combining sodium carbonate, disodium phosphate, water and caustic soda (suitably in the proportion of two hundred and fifty pounds of sodium carbonate in the form of soda ash of 58% or 48%, two hundred and fifty pounds of sodium phosphate, ninety-two pounds of water, and sixty-four pounds of caustic soda in the form of a 45% solution), with the production of tri-sodium phosphate and hydrated sodium carbonate.

In practice the sodium carbonate and sodium phosphate may be intimately mixed together and the combined water and caustic soda gradually added thereto while the mass is constantly stirred until cooled; the water added being insufficient in amount to dissolve the sodium carbonate, the chemical reaction effected being accompanied by the evolution of a large amount of steam and heat, the resulting product being a dry, pulverulent mass consisting of mechanically mixed tri-sodium phosphate and hydrated sodium carbonate, in a form particularly useful in the arts, particularly as a boiler compound and for the usual purposes thereof.

A true chemical reaction with the production of a non-crystalline product may be obtained by combining sodium carbonate, sodium phosphate and water, as by adding water to the combined carbonate and phosphate without dissolving the carbonate, the operation being accompanied by stirring, with evolution of steam and heat, until the product is cooled and the result being a dry pulverulent mass. This mass, consisting of hydrated sodium carbonate and disodium phosphate mechanically mixed, in non-crystalline form, may be used at once or at any time subsequently for combination with any of the caustic alkalies for changing the disodium phosphate to tri-sodium phosphate, in amorphous form, and mechanically mixed with the amorphous hydrated sodium carbonate.

By these operations I am enabled to get a desired mechanical mixture of hydrated sodium carbonate with a comparatively high percentage of tri-sodium phosphate, in a desired form, without resort to the more expensive process of crystallization, reduction and mechanically mixing.

It will be understood that the operations may be varied within the scope of my invention, as by dissolving the phosphate of soda in hot water and adding this to the sodium carbonate, or using dry caustic soda equivalent to the caustic in solution.

Having described my invention, I claim:

1. The herein described composition of matter consisting of the combination of sodium carbonate, a chemical salt, and water so as to produce a non-crystalline product, substantially as specified.

2. The herein described composition of matter consisting of the combination of sodium carbonate, phosphate of soda, and water insufficient to dissolve the sodium carbonate, so as to produce a pulverulent product, substantially as specified.

3. The process herein described which consists of the acts of combining sodium carbonate, phosphate of soda, caustic soda, and water in insufficient amount to dissolve the sodium carbonate, substantially as specified.

4. The process herein described which consists of the acts of combining sodium carbonate, phosphate of soda, caustic soda and water, the addition of the water to the carbonate being accompanied by stirring and the amount of water so added being insufficient to dissolve the carbonate, substantially as specified.

5. The process herein described which consists of the acts of combining sodium carbonate, phosphate of soda, caustic soda and water, approximately in the proportion of two hundred and fifty pounds of sodium carbonate in the form of soda ash, two hundred and fifty pounds of phosphate of soda, ninety-two pounds of water, and the equivalent of sixty-four pounds of caustic soda solution.

6. The process herein described which consists of the acts of combining sodium carbonate, phosphate of soda, a caustic alkali, and water without dissolving the sodium carbonate.

In witness whereof I have hereunto set my name this 22nd day of July, A. D. 1908, in the presence of the subscribing witnesses.

WM. E. RIDENOUR.

Witnesses:
ROBERT JAMES EWING,
JOS. G. DENNY, Jr.